United States Patent Office 3,202,209
Patented Aug. 24, 1965

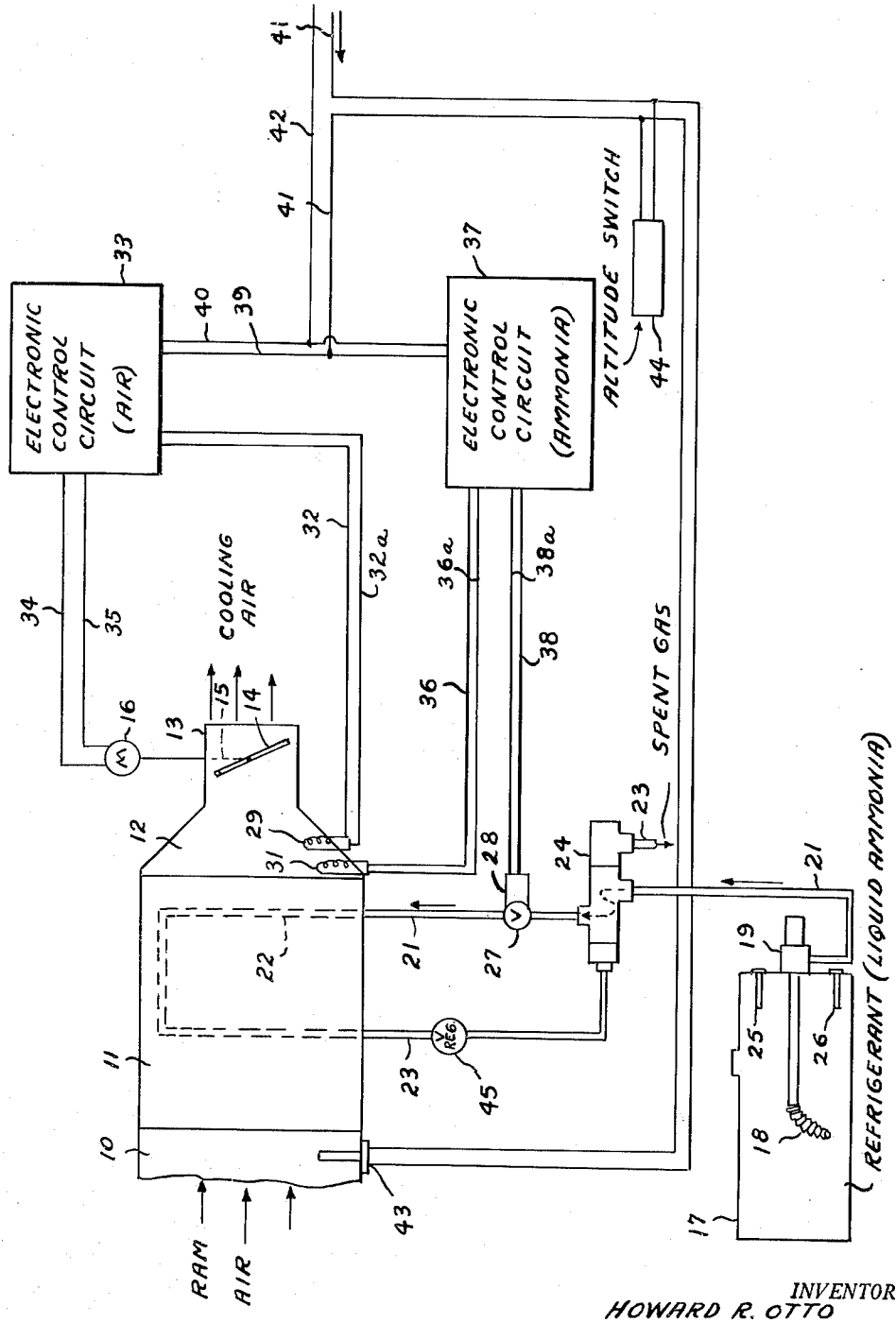

3,202,209
HEAT TRANSFER SYSTEM
Howard R. Otto, Kettering, and Ewald J. Kimm, Dayton, Ohio, assignors to United Aircraft Products, Inc., Dayton, Ohio, a corporation of Ohio
Filed May 10, 1961, Ser. No. 109,117
2 Claims. (Cl. 165—32)

This invention relates to heat transfer systems using a gaseous medium such as air to cool a heat producing means, for example electronic equipment. Although not so limited the invention has especial reference to airborne systems wherein ram air is supplied as the direct heat absorber.

An object of the invention is to sense and to respond to changing conditions of ram air, in a system as described, with the view of maintaining substantially uniform conditions of temperature and mass flow rate in the cooling air supplied to the heat producing means.

Another object of the invention is to provide a system as described in the form of a combination of elements comprising a unitary assembly.

A further object of the invention is to provide for overriding system controls obviating operation of the system at temperatures below a predetermined value and to initiate operation in response to a predetermined decrease in air weight irrespective of temperature.

Other objects and structural details of the invention will appear from the following description when read in connection with the accompanying drawing, which is a diagram of a system in accordance with one possible embodiment of the invention.

Referring to the drawings, an air-borne type system there is disclosed in which a duct 10 receives ram air for use as a heat absorber. Stationed in the duct 10 is a heat exchanger 11 and on the outlet or downstream side of the heat exchanger an adapter section 12 of the duct leads to a reduced diameter cylindrical section 13. Within the section 13, and having a regulating effect upon air flow therethrough, is a butterfly valve 14 supported and turned by a means 15 and adapted to be rotatably adjusted by an electric motor 16. As indicated, ram air enters the duct 10, passes through the heat exchanger 11 and through duct sections 12 and 13, in the latter of which a regulating effect as to quantity flow is achieved by rotatably positioning the valve 14 through operation of the motor 16. Beyond valve 14 the air is directed in the performance of its cooling function and subsequently is discharged overboard, all in a manner which it is thought unnecessary here to consider.

The heat exchanger 11 is adapted for a flow of different fluids therethrough in heat transfer relation. One such fluid is the described ram air conducted through the system by way of duct 10. The other is a selectively supplied expendable refrigerant, in the illustrated instance liquid ammonia. A supply of the liquid ammonia is contained in a reservoir 17. Within the reservoir or tank 17 a flexible pick-up member 18 draws upon the contained body of liquid in all flight attitudes and delivers it by way of a valve fitting 19 to a pipe 21. The latter conducts the liquid to the heat exchanger 11 where it follows a path 22 therethrough. In the path 22 the liquid refrigerant is evaporated as it comes into heat transfer relation with the ram air and is conducted away from the heat exchanger by way of a pipe 23 as a gas. In a spent form it is discharged overboard. As indicated, there may be interposed in the pipe lines 21 and 23 an economizer in the form of a small heat exchanger wherein the waste refrigerant gases are used to cool the liquid refrigerant as it flows to the heat exchanger. Flow of the liquid ammonia from the tank 17 to the heat exchanger 11 is under the influence of self-generating pressure, produced, when necessary, by a heating of the liquid in the reservoir by heaters 25 and 26. Suitably controlled, the heaters 25 and 26 inhibit a reduction in temperature in the tank 17 below a predetermined value, in accordance with which concept there is maintained in the tank or reservoir a temperature sufficient to pressurize the tank as the volatile refrigerant attempts to vaporize.

In addition to the valve 19, which is open in the operation of the system, flow of the liquid ammonia to the heat exchanger is controlled by an inlet valve 27 opening and closing in response to the energizing and deenergizing of an electromagnetic device 28. Valve 27 is normally closed and opens in response to energizing of the device 28. Flow of the refrigerant or liquid ammonia to the heat exchanger 11 is thus permitted or denied in accordance with the energizing or deenergizing of the device 28, the latter forming with the valve 27 an on-off control for the refrigerant flow. The butterfly valve 14 is, on the other hand, a modulating type of control the purpose of which is to effect variations in the mass flow rate of air through and beyond duct section 13 to its place of use. Together, the refrigerant valve 27 and the air flow control valve 14 cooperate to supply air to its place of use at or about a selected temperature and at or about a predetermined rate expressed in terms of pounds per minute. To maintain the selected conditions at the place of use variations in the temperature and the mass weight of the air directed to such place are sensed and responded to by operations of the valve 14 and the valve 27.

Performing the sensing function are probes 29 and 31 installed in the duct section 12 in the path of the air flow emerging from the heat exchanger 11. Probe 29 is connected by electrical conductors 32 and 32a to an electronic control circuit 33 which is in turn connected by leads 34 and 35 to the motor 16. Probe 31 is connected by electrical conductors 36 and 36a to an electronic control circuit 37 which is in turn connected by conductors 38 and 38a to the electromagnetic device 28 of valve 27. The circuits 33 and 37 are interconnected by electrical conductors 39 and 40 which are fed from respective supply lines 41 and 42. Line 41 is relatively extended to pass through a thermostatic switch 43 stationed in the duct 10 ahead of the heat exchanger 11. In by-passing relation to the thermostat 43, also in supply line 41 is an ambient pressure responsive or altitude switch 44. The thermostatic switch 43 is normally open and is arranged to close at a predetermined high temperature value of the incoming or ram air. At temperatures under the selected value the air passes through the heat exchanger 11 without achieving a heat transfer relation to the refrigerant which is denied access to the heat exchanger by virtue of the normally closed valve 27. Similarly, the mass flow rate of the air is unchanged by the valve 14 which is stationary and may occupy a normal position of minimum restriction parallel to the direction of air movement. Even though the air temperature may be below the value necessary to close switch 43 the electronic control circuits may be energized by the closing of altitude switch 44 in the event decreasing ambient pressure indicates the need for a controlled mass flow rate at the valve 14. Thus, switch 44 may be made to remain open at ambient pressures above a selected value and to close upon a decrease in ambient pressure below such value.

The probe 29 utilizes basic principles of platinum-like resistance thermometry to take direct measurements of variations in the mass air flow and to provide an electrical output of corresponding variation. The windings of the probe make a basic temperature measurement from which the total mass flow in the duct is determined. The resistance element is heated by a relatively high steady current which is, however, affected in its flow by heat transfer variations resulting from variations in the mass of the air to which the resistance element is exposed. In general, the rate of heat transfer from the resistance coil is a function of the rate of mass flow. The probe, through the cable 32, is connected into the electronic circuit 33. While this signal, expressed as a voltage error or change, may be variously used to achieve a regulating adjustment of valve 14, a system as diagrammatically shown may comprise a Wheatstone bridge network which is unbalanced by the voltage error, means detecting and amplifying the bridge unbalance, and servo means operating the motor 16. In addition, means arbitrarily restoring the bridge balance in effect provides feedback signals whereby the valve motion is in steps to minimize hunting. The probe 31 similarly is a platinum coil type of temperature sensing device developing a voltage error in response to air temperature changes and signaling the control circuit 37. The latter is constructed substantially like the circuit 33 to detect voltage errors at the probe 31 and to amplify the resulting signal into an intermittant energizing of the electromagnetic device 28. Opening of the valve 27 admits liquid ammonia to the heat exchanger and this flow continues until the temperature of the air is reduced to again balance the bridge network in circuit 37 to permit closing of the valve 27. The valve makes or may make continuous opening and closing movements in the operation of the system sending the liquid ammonia to the heat exchanger in short, spaced surges in a manner limiting opportunity for overcooling of the air and simplifying the work of obtaining a substantially constant outlet air temperature.

In the operation of the system, therefore, the heat transfer and control system is inactive until the ram air temperature rises above a selected value or until the ambient pressure decreases to a certain value. When one or the other of these conditions is reached electrical current is supplied to the circuits 33 and 37 which then begin to operate under the control of the sensing elements 29 and 31. Mass air flow is increased and decreased as required to supply to the place of use a given amount of air in terms of pounds per minute. Similarly, under the influence of temperature sensor 31, the valve 27 is opened and closed with a frequency calculated to produce whatever rate of cooling is necessary in the heat exchanger 11 to bring the supplied air to a selected temperature value. The system continues in such automatic operation until both the thermostatic switch 43 and the altitude switch 44 open, if both have been closed.

The system has been disclosed in a diagrammatic form in order that attention may be directed to the combination aspect of the invention. The individual elements of the system are in the main known and may assume varying forms. Similarly the system may include elements other than those here shown, for example a thermostatic control for the heater elements 25 and 26, filters in the refrigerant line and a back pressure valve 45 at the refrigerant outlet of the heat exchanger which may serve a purpose of inhibiting frost formation in the heat exchanger at low altitudes, assist in maintaining refrigerant pressure in the heat exchanger at a correct level and assist in conserving consumption of the refrigerant.

What is claimed is:

1. In a heat transfer system, the combination of a heat exchanger, means for flowing first and second fluids in separated relation through said heat exchanger for a transfer of heat therebetween, electrically energized control means responding to changes in the mass flow of said first fluid and to changes in temperature of said first fluid after passing through said heat exchanger for regulating flow of said fluids through said heat exchanger, an electrical supply line to said control means, and control switches in said line arranged to close said supply line for current flow to said control means in response either to the achieving of a predetermined high temperature of said first fluid prior to passing through said heat exchanger or to the achieving of a predetermined low ambient pressure.

2. In a heat transfer system, the combination of a heat exchanger, means conducting a gas through said heat exchanger, including a duct, a pair of sensor devices in said duct on the outlet side of said heat exchanger in relation to the direction of flow of said gas therethrough, one of said devices sensing the temperature of said gas and the other the mass flow thereof, means for directing a refrigerant to and through said heat exchanger in heat transfer relation to the gas therein, said last named means including a source of an expendible refrigerant and a conducting line from said source to said heat exchanger, a valve in said duct for modulating flow of said gas, a valve in said conducting line for shutting off and opening flow of refrigerant to said heat exchanger, normally inactivated individual control means responsive to said respective sensor devices for adjusting said valves, and means for activating said control means in response either to the achieving of a predetermined high temperature of said gas prior to passing through said heat exchanger or to the achieving of a predetermined low ambient pressure.

References Cited by the Examiner

UNITED STATES PATENTS

| | | | |
|---|---|---|---|
| 1,768,941 | 7/30 | Sneatt | 165—32 |
| 2,254,185 | 8/41 | Newton | 165—22 |
| 2,257,916 | 10/41 | Poythress | 257—282 |
| 2,696,975 | 12/54 | Massey et al. | 165—15 |
| 2,806,675 | 9/59 | Conradi | 165—22 |

CHARLES SUKALO, *Primary Examiner.*
HERBERT L. MARTIN, PERCY L. PATRICK,
*Examiners.*